US011072496B2

(12) United States Patent
Gettig et al.

(10) Patent No.: US 11,072,496 B2
(45) Date of Patent: Jul. 27, 2021

(54) SUGARCANE HARVESTER ELEVATOR CONVEYOR GUIDE UNIT

(71) Applicant: Deere & Company, Moline, IL (US)

(72) Inventors: Blake C. Gettig, Thibodaux, LA (US); Jason R. Dehnke, Thibodaux, LA (US); Dusk S. Mixon, Thibodaux, LA (US); Todd J. Rodrigue, Thibodaux, LA (US)

(73) Assignee: Deere & Company, Moline, IL (US)

( * ) Notice: Subject to any disclaimer, the term of this patent is extended or adjusted under 35 U.S.C. 154(b) by 416 days.

(21) Appl. No.: 15/725,592

(22) Filed: Oct. 5, 2017

(65) Prior Publication Data

US 2019/0106280 A1    Apr. 11, 2019

(51) Int. Cl.
| | | |
|---|---|---|
| *B65G 23/44* | (2006.01) | |
| *B65G 23/06* | (2006.01) | |
| *A01D 61/04* | (2006.01) | |
| *A01D 61/00* | (2006.01) | |
| *A01D 45/10* | (2006.01) | |

(52) U.S. Cl.
CPC ........... *B65G 23/44* (2013.01); *A01D 61/008* (2013.01); *A01D 61/04* (2013.01); *B65G 23/06* (2013.01); *A01D 45/10* (2013.01)

(58) Field of Classification Search
CPC ........ B65G 23/44; B65G 23/06; B65G 39/16; A01D 45/10; A01D 61/04
See application file for complete search history.

(56) References Cited

U.S. PATENT DOCUMENTS

| | | | | |
|---|---|---|---|---|
| 270,718 A | * | 1/1883 | Albey ................ | B65G 39/16 474/106 |
| 1,096,268 A | * | 5/1914 | Sargent .............. | B65G 39/16 474/107 |
| 1,152,439 A | * | 9/1915 | Sargent et al. ...... | B65G 39/16 474/107 |
| 1,227,835 A | * | 5/1917 | Sargent .............. | B65G 39/16 474/106 |
| 2,570,364 A | * | 10/1951 | Mercier .............. | B65G 39/16 198/501 |
| 2,619,223 A | * | 11/1952 | Rawlinson ......... | B65G 39/16 198/806 |
| 3,058,573 A | * | 10/1962 | Lo Presti ........... | B65G 39/16 198/824 |
| 3,456,429 A | * | 7/1969 | Sexton, Jr. ......... | A01D 45/10 56/13.7 |
| 4,121,778 A | * | 10/1978 | Quick ................ | A01D 45/10 209/139.1 |

(Continued)

OTHER PUBLICATIONS

Image of Elevator Sprocket System (1 page) (prior art before Oct. 5, 2017).

*Primary Examiner* — Thomas B Will
*Assistant Examiner* — Joan D Misa

(57) ABSTRACT

A conveyor guide unit for use in an elevator of a sugarcane harvester comprises a housing, an axle positioned in and supported by the housing, and a rotor mounted to the axle for rotation about a rotation axis and configured to interface with a conveyor of the elevator. The axle and the rotor mounted thereto are selectively repositionable axially along the rotation axis relative to the housing for lateral adjustment of the rotor relative to the conveyor.

10 Claims, 15 Drawing Sheets

(56) References Cited

U.S. PATENT DOCUMENTS

| | | | | |
|---|---|---|---|---|
| 4,362,005 A * | 12/1982 | Hanaway | ............... | A01D 41/14 |
| | | | | 198/814 |
| 4,421,228 A * | 12/1983 | Marsiglio | .............. | B65G 23/44 |
| | | | | 198/814 |
| 4,897,986 A * | 2/1990 | Baker | .................... | A01D 45/10 |
| | | | | 384/537 |
| 5,180,342 A * | 1/1993 | Van Ee | ................. | B65G 39/16 |
| | | | | 474/101 |
| 7,044,844 B2 * | 5/2006 | Caporusso | .............. | B24B 9/007 |
| | | | | 451/297 |
| 7,419,448 B2 * | 9/2008 | Miyata | ..................... | F16H 7/12 |
| | | | | 474/118 |
| 7,563,187 B2 * | 7/2009 | Miyata | .................. | B65G 39/16 |
| | | | | 474/118 |

* cited by examiner

SUGARCANE HARVESTER ELEVATOR CONVEYOR GUIDE UNIT

FIELD OF THE DISCLOSURE

The present disclosure relates to a sugarcane harvester elevator and, in particular, to support of a conveyor of the elevator.

BACKGROUND OF THE DISCLOSURE

Known sugarcane harvesters are configured to harvest sugarcane plants and chop the stalk into segments called "billets." An elevator at the rear of the sugarcane harvester conveys the billets to an elevated position where they are discharged into a wagon to be hauled away. The conveyor is configured as a closed-loop conveyor supported by a number of guide units. Each guide unit comprises a sprocket that rotatably interfaces with the respective run of the conveyor.

SUMMARY OF THE DISCLOSURE

According to an aspect of the present disclosure, a guide unit is disclosed for use in an elevator of a sugarcane harvester. The elevator comprises a closed-loop conveyor configured to convey harvested sugarcane. The conveyor guide unit comprises a housing, an axle positioned in and supported by the housing, and a rotor mounted to the axle for rotation about a rotation axis and configured to interface with the conveyor. The axle and the rotor mounted thereto are selectively repositionable axially along the rotation axis relative to the housing between a first operational position fixed relative to the housing and a second operational position fixed relative to the housing, for lateral adjustment of the rotor relative to the conveyor. As such, misalignment between the rotor and the conveyor can be avoided or corrected, which misalignment may otherwise cause the rotor, the conveyor, or one or more other components to wear prematurely.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
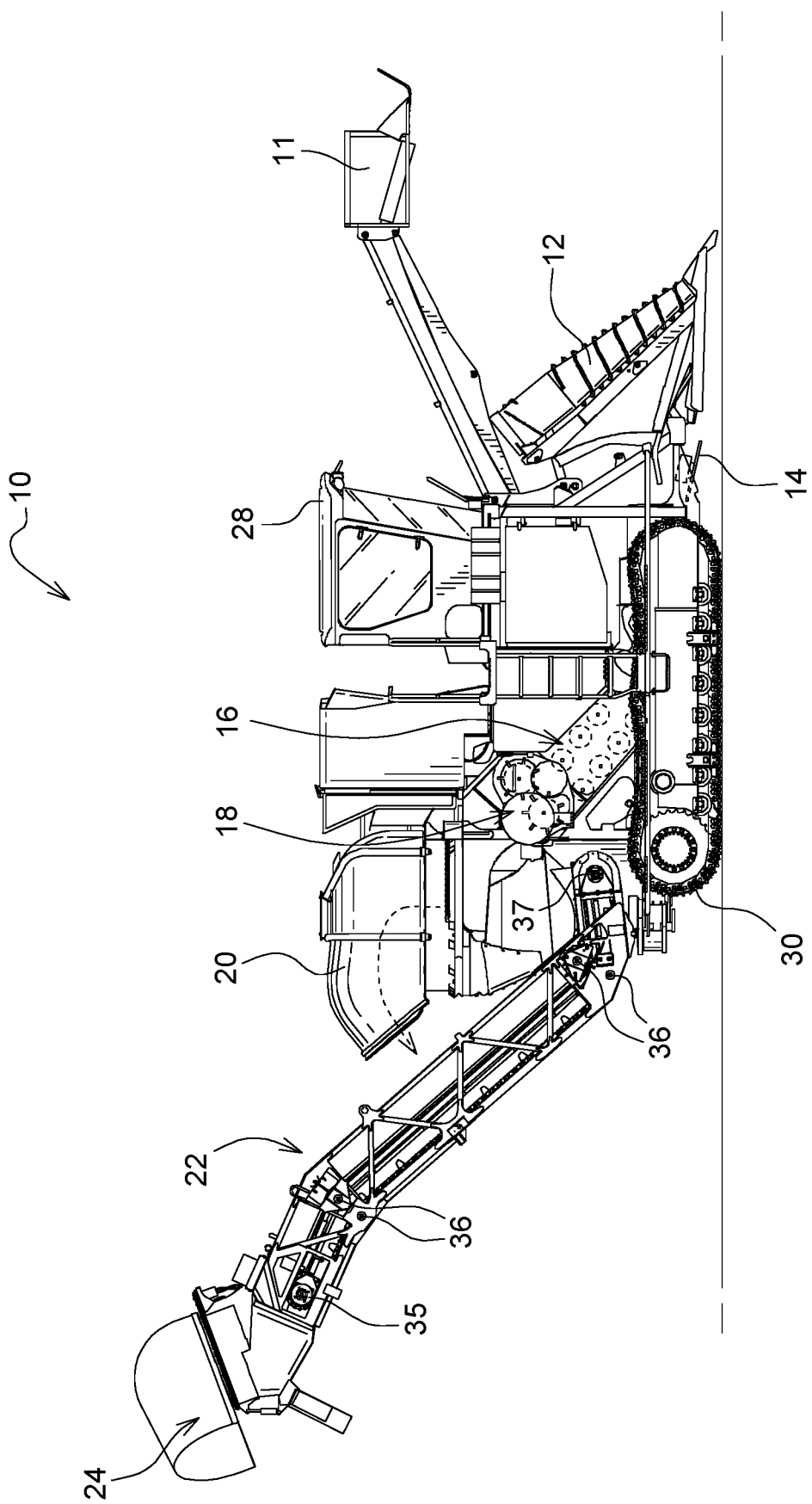
FIG. 1 is a side elevational view showing a sugarcane harvester with an elevator at the rear of the sugarcane harvester.

Referring to FIG. 1, a sugarcane harvester 10 is configured to harvest sugarcane. Illustratively, the harvester 10 comprises a topper 11, a left and a right crop divider scroll 12 (the left crop divider scroll 12 not shown), an upper knockdown roller and a lower knockdown roller (the knockdown rollers not shown), a basecutter 14, a feed section 16, a chopping section 18, a primary extractor 20, an elevator 22, and a secondary extractor 24. The topper 11 is configured to cut off the leafy top portion of sugarcane plants so as not to be ingested into the harvester 10. The left and right crop divider scrolls 12 are configured to lift the sugarcane for feeding into the throat of the harvester 10.

The basecutter 14 comprises a left cutting disk and a right cutting disk (the left cutting disk not shown). The left and right cutting disks cooperate with one another to sever the stalk of sugarcane knocked down forwardly by the knockdown rollers at a location near the ground. The feed section 16 is configured to receive from the basecutter 14 a mat of severed sugarcane and to feed the mat rearwardly. The chopping section 18 is configured to receive the mat from the feed section 16 and cut the sugarcane stalk into billets. The primary extractor 20 is positioned downstream from the chopping section 18 and is configured to separate debris, including, for example, crop residue (e.g., leafy material), from the billets and remove the debris from the harvester 10.

The elevator 22 is positioned at the rear of the harvester 10 to receive the cleaned flow of billets, and is configured to convey the billets to an elevated position where they are discharged into a wagon to be hauled away. The secondary extractor 24 (some embodiments may not have a secondary extractor) is positioned near the top of the elevator 22, and is configured to further separate debris from the billets and remove the debris from the harvester 10.

The harvester 10 comprises an operator's station 28 and traction elements 30. A human operator may operate the harvester 10 from the operator's station 30. The traction elements 30 are positioned on the left and right sides of the harvester 10 for propelling the harvester 10 along the ground. Each traction element 30 may be, for example, a track unit or a ground-engaging wheel (e.g., there is one track unit on each side of the harvester 10 as shown, for example, with respect to the right side in FIG. 1).

Figure 2:
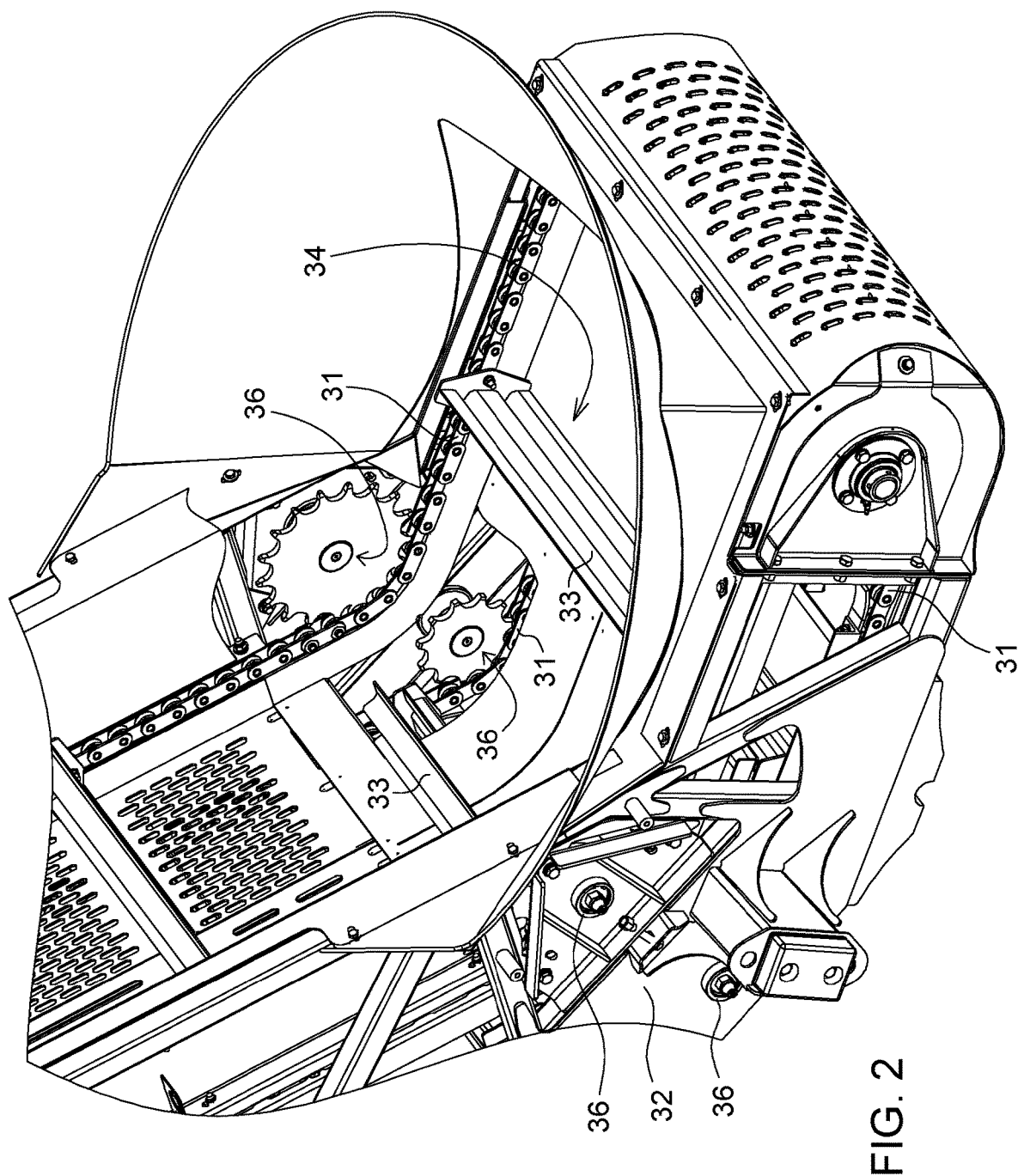
FIG. 2 is a perspective view showing a conveyor of the elevator which is supported by a number of guide units.

Referring to FIG. 2, the elevator 22 comprises a frame 32, a closed-loop conveyor 34, and a number of conveyor guide units 36 mounted to the frame 32. Illustratively, the conveyor 34 comprises two side chains 31 spaced laterally apart from one another and a plurality of flights 33 positioned between and coupled to the side chains 31. The elevator 22 comprises a drive unit 35 (FIG. 1) near the top of the elevator 22, and a tail unit 37 (FIG. 1) near the bottom of the elevator 22, with the drive and tail units 35, 37 positioned at the longitudinal extents of the conveyor 34. The side chains 31 are trained about the drive unit 35, the guide units 36, and the tail unit 37. The drive unit 35 is configured to drive the conveyor 34 to circulate about its closed-loop path. The guide units 36 are positioned along the laterals sides of the conveyor 34 to guide movement of the conveyor 34 and maintain its alignment between the drive and tail units 35, 37.

A number of guide units 36 are positioned near the top of the conveyor 34 and near the bottom of the conveyor 34. For example, near each of the top and bottom of the conveyor 34, there are four guide units 36, two on each side, one for the top run of the conveyor 34 and one for the bottom run of the conveyor 34. The lower guide units 36 may be mounted to a main portion of the frame 32, and the upper guide units 36 may be mounted to an adjustable portion of the frame 32 which is adjustable relative to the main portion of the frame 32.

Figure 3:
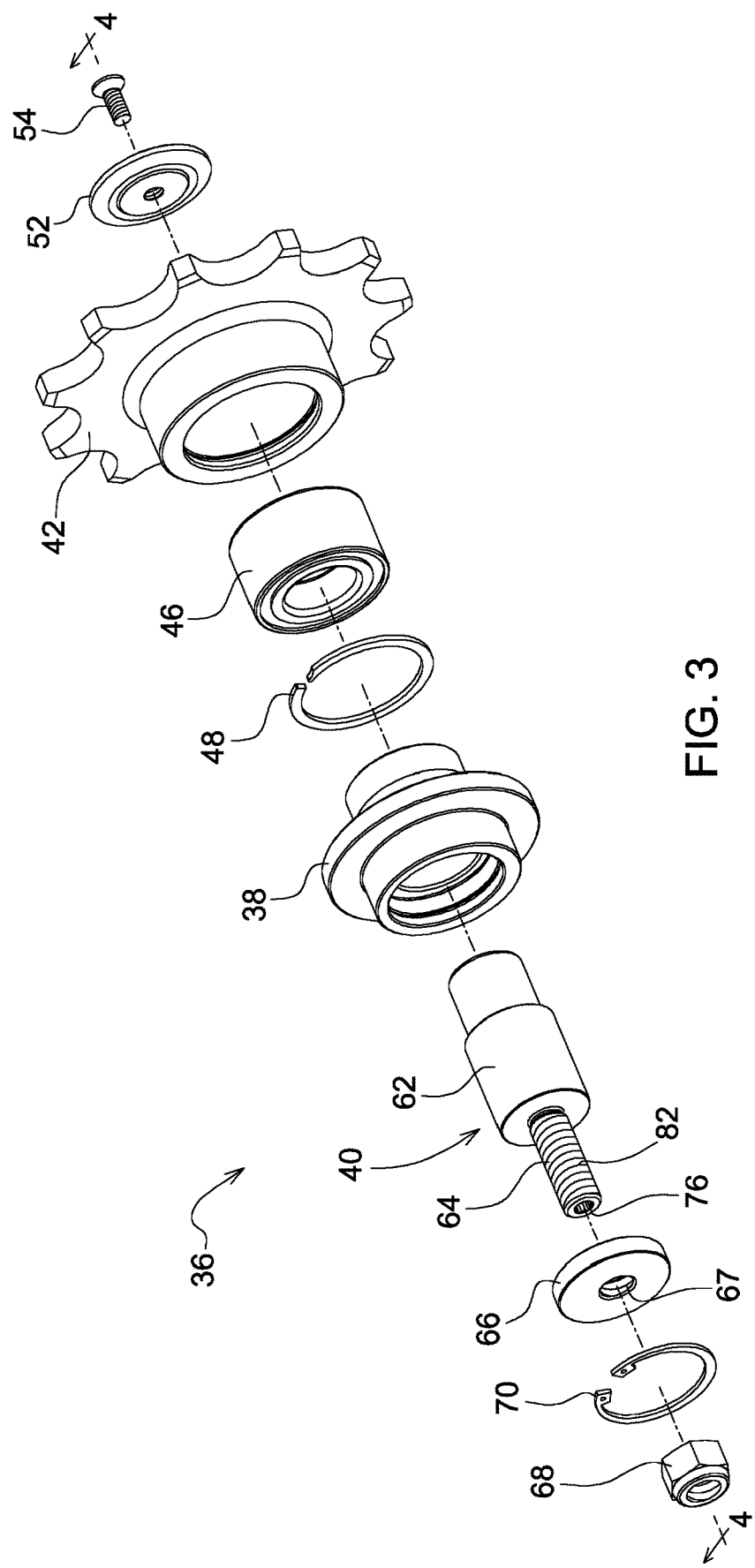
FIG. 3 is an exploded perspective view showing a conveyor guide unit according to a first embodiment.
Figure 4:
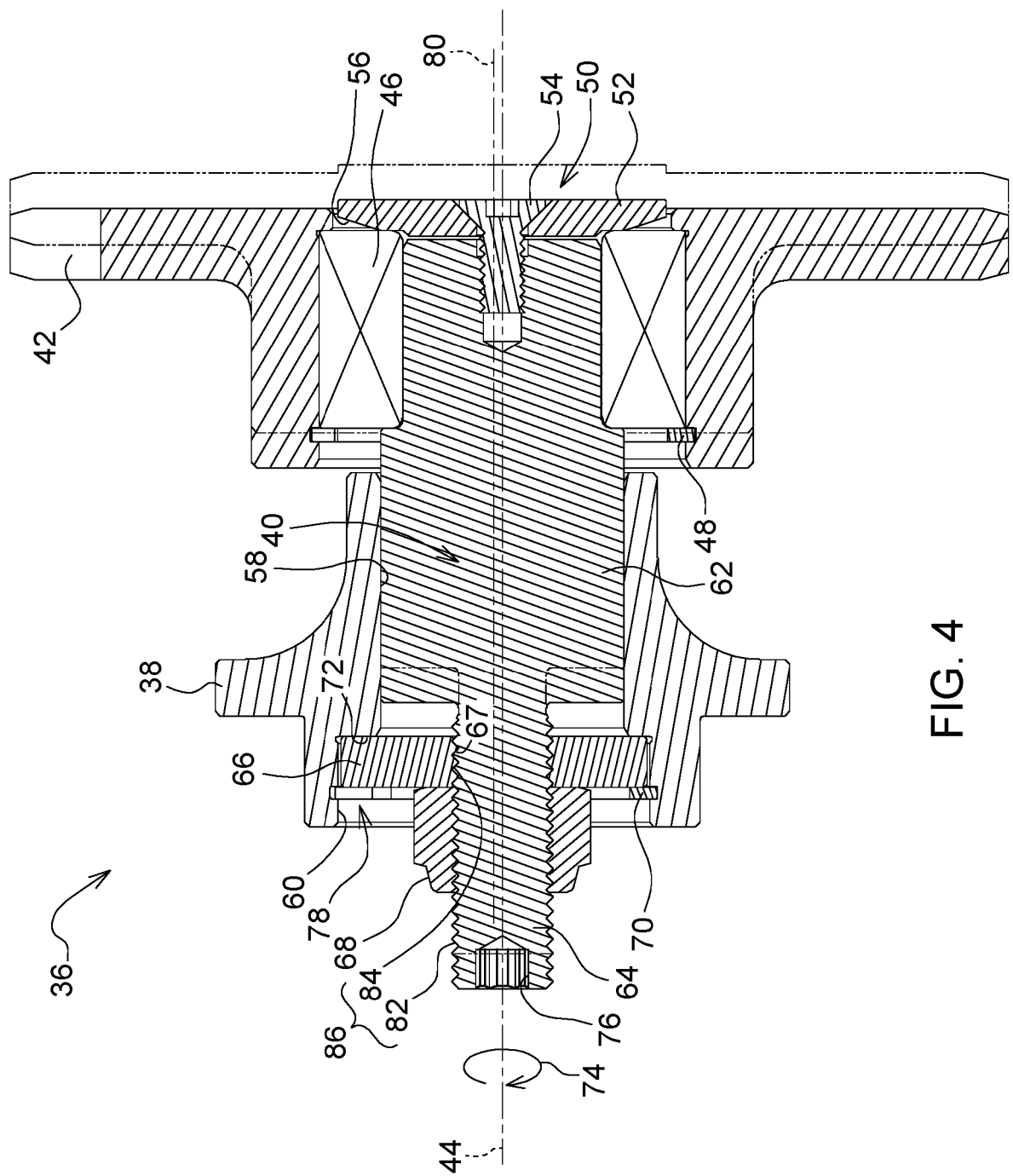
FIG. 4 is a sectional view, taken along lines 4-4 of FIG. 3, showing the conveyor guide unit according to the first embodiment.

Referring to FIGS. 3 and 4, each guide unit 36 comprises a housing 38, an axle 40 positioned in and supported by the housing 38 so as to be mounted thereto, and a rotor 42. The rotor 42 is mounted to the axle 40 for rotation about a rotation axis 44 and configured to interface with the conveyor 34.

The housing 38 is mounted to the frame 32. The housing 38 may be fixed (e.g., welded) to the frame 32. In an example, the housing 38 comprises an annular flange that abuts the frame 32, an outer portion extending laterally outwardly from the flange relative to the conveyor 34 and received in an aperture of the frame 32, and an inner portion extending laterally inwardly from the flange relative to the conveyor 34, with the flange and the outer portion fixed (e.g., welded) to the frame 32.

Referring to FIG. 4, the rotor 42 is mounted to an inner portion of the axle 40 via a bearing 46 (configured, for example, as a double-row tapered roller bearing). A retainer 48 (e.g., snap ring) and a shoulder of the rotor 42 cooperate to retain the rotor 42 on the bearing 46. A retainer 50 and a shoulder of the axle 40 cooperate to sandwich the bearing 46 therebetween to retain the bearing 46 on the axle 40. The retainer 50 comprises a disk 52 and a fastener 54 threadedly engaged to the axle such that the disk 52 presses against the bearing 46. The disk 52 comprises an annular taper 56 to promote debris egress away from the bearing seal. In an example, the conveyor 34 comprises laterally extending flights attached to a chain on either lateral side of the conveyor 34 with the chains driven by the drive unit so that the flights move billets over a fixed floor to the discharge point, and the rotor 42 may be a sprocket that engages the respective chain.

The axle 40 is positioned in the housing 38. The axle 40 is positioned in a cylindrical first bore 58 of the housing 38 and a cylindrical second bore 60 of the housing 38. A first axle portion 62 of the axle 40 is positioned in the first bore 58 of the housing 38 for slidable movement therein along the rotation axis 44, and a second axle portion 64 of the axle 40 is positioned in the second bore 60 and is smaller in diameter than the first axle portion 62. Illustratively, the first axle portion 62 slidably contacts the first bore 58.

A reaction device 66 is positioned in the second bore 60 and constrained axially therein relative to the rotation axis 44. The axle 40 and the reaction device 66 are positioned in threaded engagement with one another. The axle 40 is positioned in threaded engagement with an aperture 67 of the reaction device 66. The second axle portion 64 and the aperture 67 of the reaction device 66 are positioned in threaded engagement with one another.

A lock 68 of the guide unit 36 releasably fixes the axle 40 to the reaction device 66 for operation of the guide unit 36. The axle 40 and the lock 68 are positioned in threaded engagement with one another such that the lock 68 contacts the reaction device 66 thereby releasably fixing the axle 40, the reaction device 66, and the lock 68 to one another. The second axle portion 64 and the lock 68 are so positioned in threaded engagement with one another. The lock 68 may be configured, for example, as a threaded nut (e.g., a jam nut).

The reaction device 66 is positioned axially between a removable retainer 70 of the guide unit 36 mounted to the housing 38 and a shoulder 72 of the housing 38 relative to the rotation axis 44. The retainer 70 and the shoulder 72 constrain the reaction device 66 axially relative to the rotation axis 44, and, as such, constrain the axle 40 and the rotor 42 mounted thereto axially relative to the rotation axis 44 during operation of the guide unit 36. The retainer 70 may be configured, for example, as a snap ring positioned in an annular groove of the second bore 60.

The second bore 60 is larger in diameter than the first bore 58 to provide the shoulder 72. The shoulder 72 is positioned between the first bore 58 and the second bore 60. The first bore 58 is positioned axially between the second bore 60 and the rotor 42 relative to the rotation axis 44.

The guide unit 36 is configurable to allow axial movement of the axle 40 and the rotor 42 mounted thereto relative to the rotation axis 44 between operational positions, for lateral adjustment of the rotor 42 relative to the conveyor 34 to avoid or correct misalignment therebetween. To do so, the lock 68 is rotated out of contact with the reaction device 66, and a rotary input 74 is applied to a tool receiver 76 of the second axle portion 64 by a tool (e.g., an Allen key). The reaction device 66 is blocked against rotation and constrained axially relative to the rotation axis 44 such that the axle 40 and the rotor 42 mounted thereto move axially along the rotation axis 44 relative to the housing 38 in response to the rotary input 74. As such, the axle 40 and the rotor 42 mounted thereto are selectively repositionable axially along the rotation axis 44 relative to the housing 38 between a first operational position fixed relative to the housing 38 (shown, for example, in solid lines in FIG. 4) and a fixed second operational position fixed relative to the housing (shown, for example, in dashed lines in FIG. 4), for lateral adjustment of the rotor 42 relative to the conveyor 34. The axle 40 and the rotor 42 mounted thereto are infinitely axially adjustable relative to the rotation axis 44 within an operational range (defined, for example, by the mechanical limits established by the guide unit 136 or other limits), including, for example, between the first operational position and the second operational position.

The tool receiver 76 may be used to facilitate movement of the lock 68 into and out of contact with the reaction device 66. The tool (e.g., an Allen key) may be inserted into the tool receiver 76 to prevent the axle 40 from rotating when the lock 68 is threaded or unthreaded toward or away from the reaction device 66.

Figure 5:
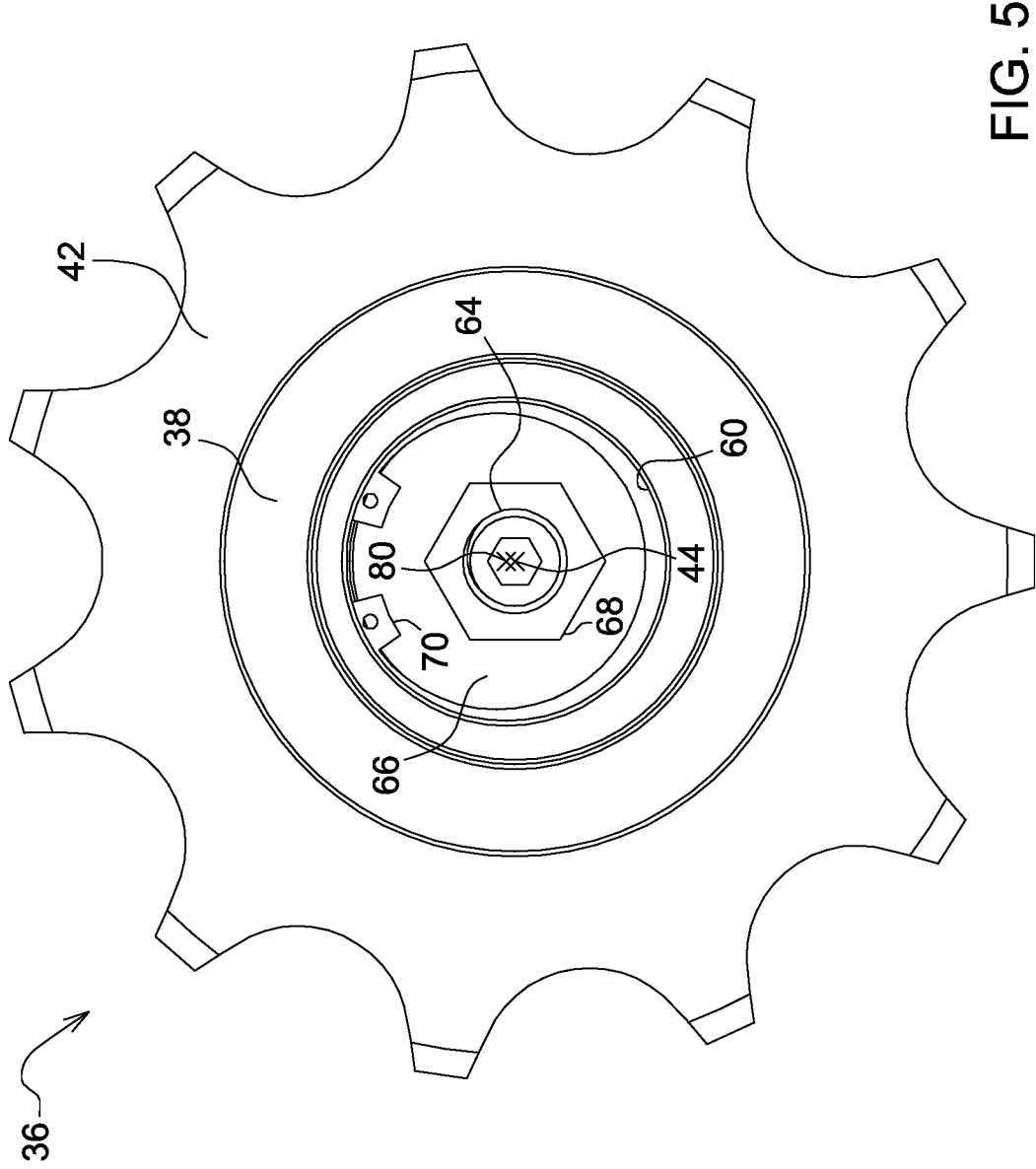
FIG. 5 is an elevational view showing an end of the conveyor guide unit according to the first embodiment.
Figure 6:
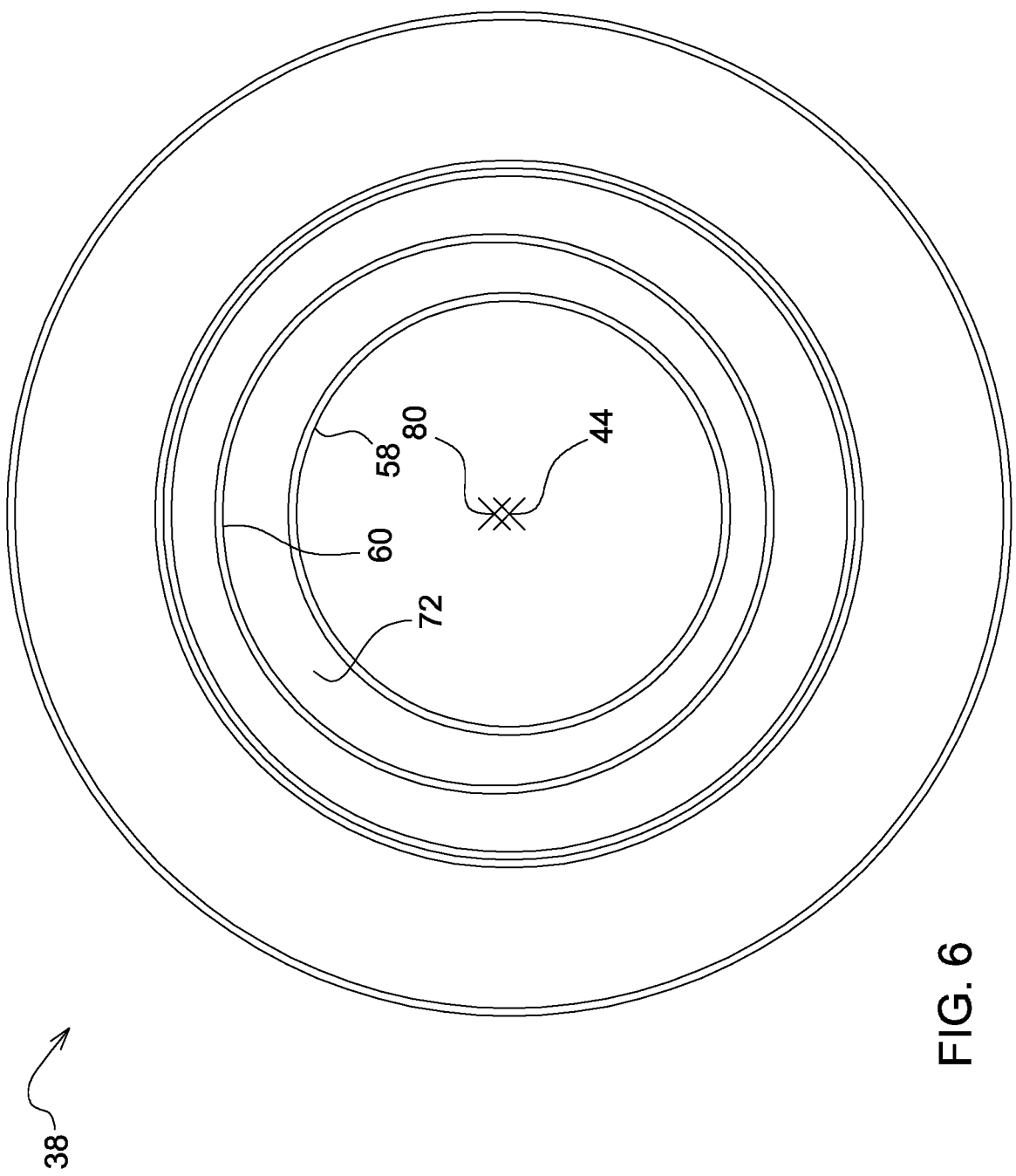
FIG. 6 is an enlarged elevational view showing a housing according to the first embodiment.
Figure 7:
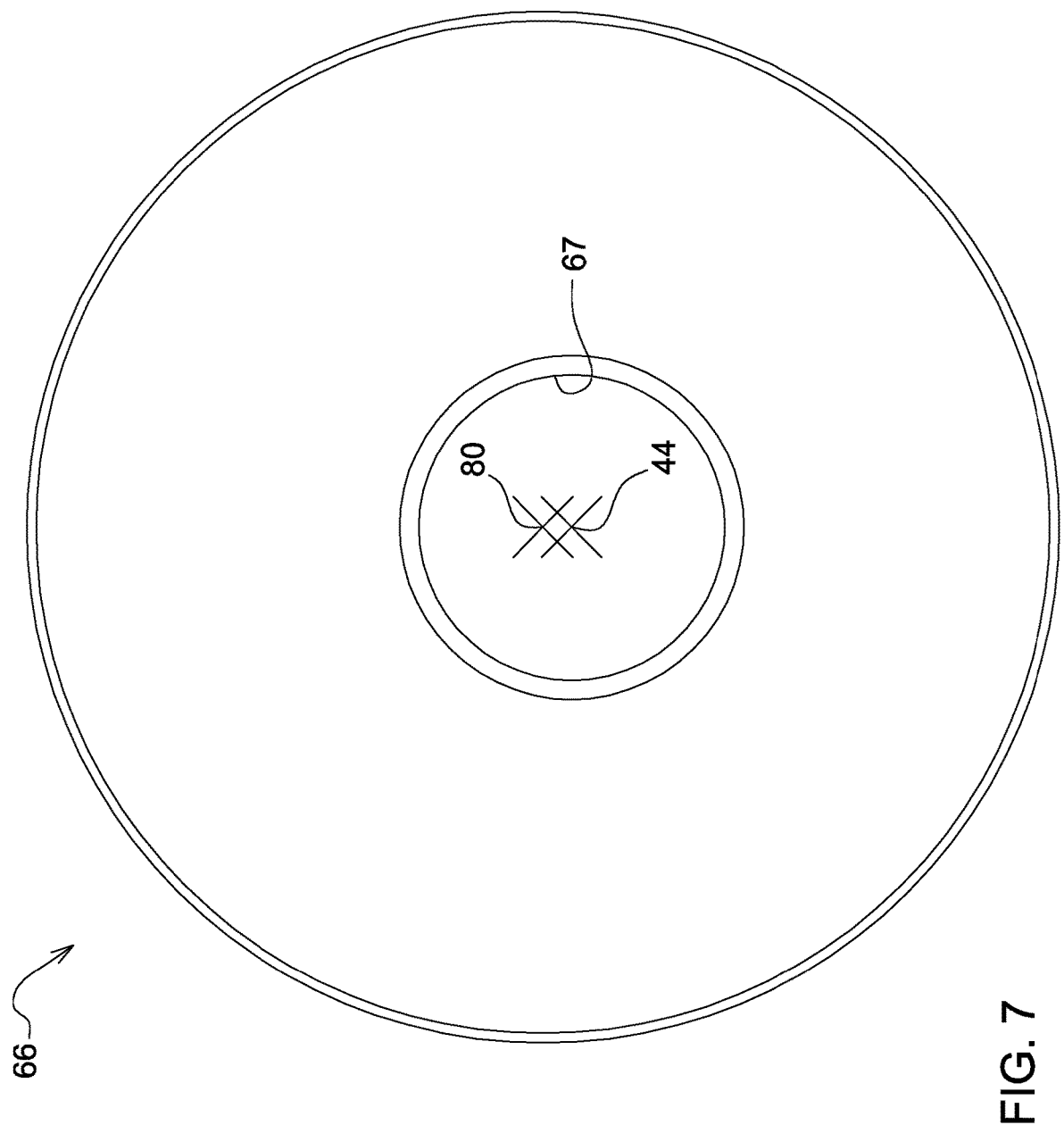
FIG. 7 is an enlarged elevational view showing a component according to the first embodiment.

Referring to FIGS. 5-7, an anti-rotation arrangement 78 of the guide unit 36 is configured to block a rotation about the rotation axis 44 to promote axial movement of the axle 40 and the rotor 42 mounted thereto relative to the rotation axis 44 in response to the rotary input 74. Rotation of the reaction device 66 relative to the rotation axis 44 is blocked to promote such axial movement in response to the rotary input 74 applied to the axle 40.

An eccentric feature blocks the rotation of the reaction device 66. The anti-rotation arrangement 78 comprises the aperture 67 of the reaction device 66 and the second bore 60. The first bore 58 is centered on the rotation axis 44 such that its central axis is coincident with the rotation axis 44. By contrast, the second bore 60 has a central axis 80 that is parallel to, but offset from, the rotation axis 44. The reaction device 66 is centered on the central axis 80 of the second bore 60, but its aperture 67 is centered on the rotation axis 44, such that the aperture 67 is eccentric relative to, for example, its own center and the central axis 80. As such, the aperture 67 is offset relative to the central axis 80 of the second bore 60.

The second bore 60 blocks rotation of the reaction device 66 when the rotary input 74 is applied to the axle 40. The reaction device 66 provides a reaction force such that the axle 40 and the rotor 42 mounted thereto move axially along the rotation axis 44 relative to the housing 38 in response to application of the rotary input 74 to the axle 40. The reaction device 66 is constrained axially relative to the rotation axis 44 and the central axis 80. The reaction device 66 may take the form of, for example, a body shaped as a disk, a periphery of which mates with the second bore 60.

The axle 40 is positioned in threaded engagement with the eccentric aperture 67, with the second axle portion 64 so positioned. As such, the second axle portion 64 comprises a first threaded portion 82, and the eccentric aperture 67 comprises a second threaded portion 84 positioned in threaded engagement with the first threaded portion 82. The first and second threaded portions 82, 84 cooperate to provide an adjustment arrangement 86 configured to direct movement of the axle 40 and the rotor 42 mounted thereto axially relative to the rotation axis 44 in response to the rotary input 74.

Figure 8:
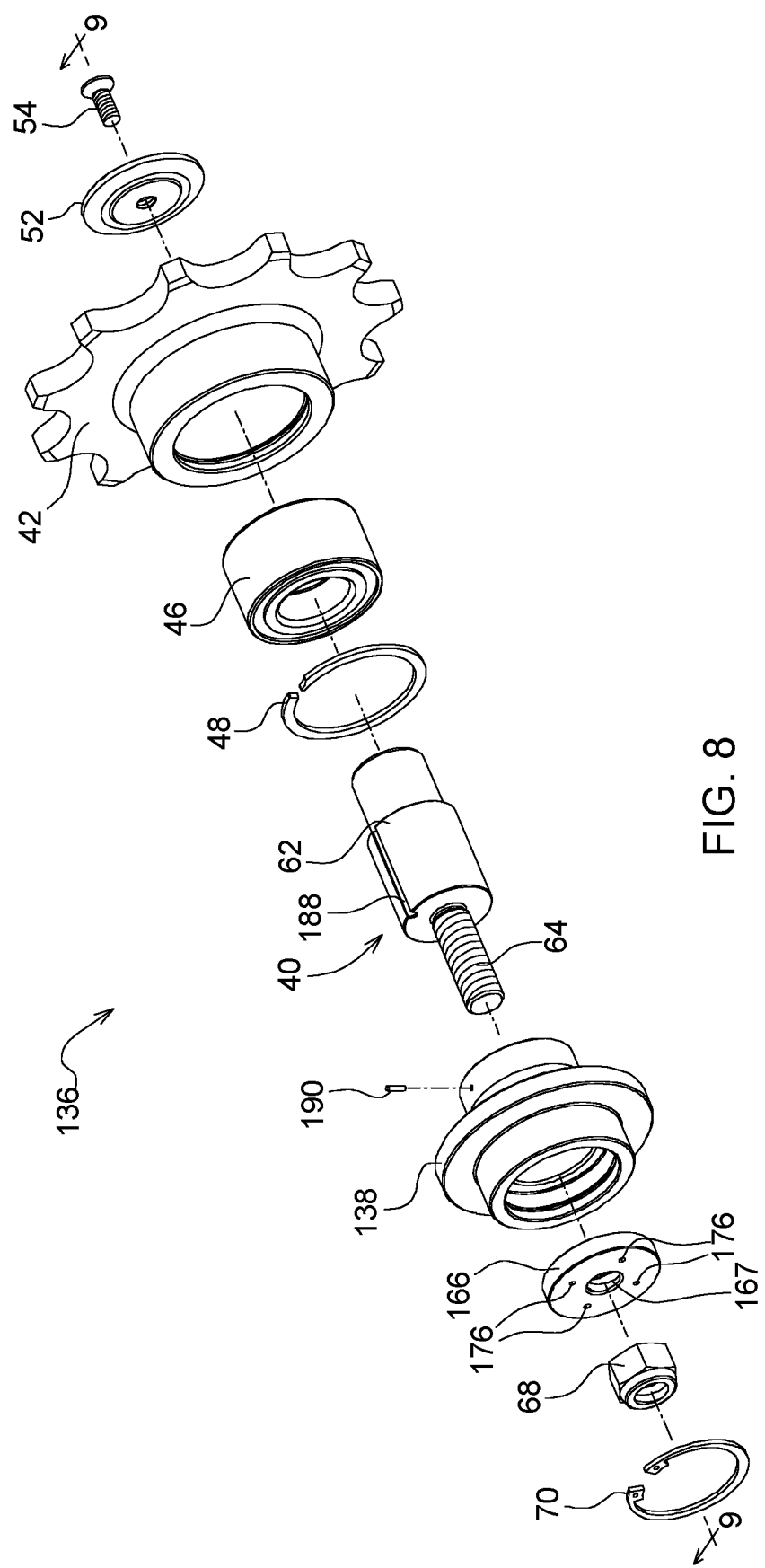
FIG. 8 is an exploded perspective view showing a guide unit according to a second embodiment.
Figure 9:
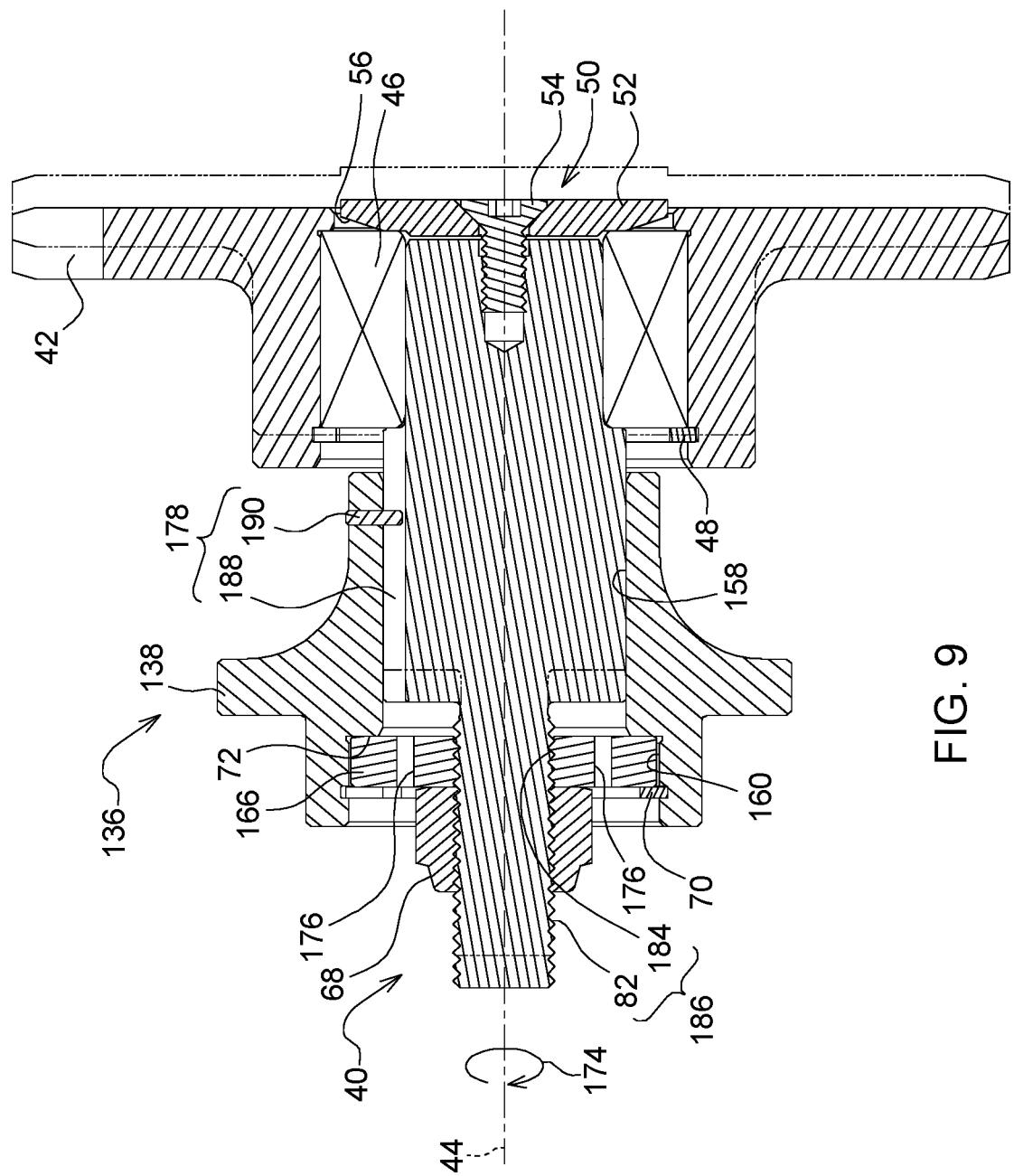
FIG. 9 is a sectional view, taken along lines 9-9 of FIG. 8, showing the conveyor guide unit according to the second embodiment.

Referring to FIGS. 8 and 9, in a second embodiment, a conveyor guide unit 136 may be employed for each of the conveyor guide units of the elevator 22. A rotary input 174 is applied to a rotary actuator 166 instead of the reaction device 66. Similar reference numbers refer to similar components.

Each guide unit 36 comprises a housing 138, the axle 40 positioned in and supported by the housing 138 so as to be mounted thereto, and the rotor 42. The rotor 42 is mounted to the axle 40 for rotation about the rotation axis 44 and configured to interface with the conveyor 34. The axle 40 of this second embodiment is similar to the axle 40 of the first embodiment, although there are some differences noted herein.

The housing 138 is positioned in and supported by the frame 32 so as to be mounted thereto. The housing 138 may be fixed (e.g., welded) to the frame 32. In an example, the housing 138 comprises an annular flange that abuts the frame 32, an outer portion extending laterally outwardly from the flange relative to the conveyor 34 and received in an aperture of the frame 32, and an inner portion extending laterally inwardly from the flange relative to the conveyor 34, with the flange and the outer portion fixed (e.g., welded) to the frame 32.

The axle 40 is positioned in the housing 138. The axle 40 is positioned in a cylindrical first bore 158 of the housing 138 and a cylindrical second bore 160 of the housing 138. The first and second bores 158, 160 are co-axial with one another and the axle 40 such that the first and second bores 158, 160 and the axle 40 are centered on the rotation axis 44. The first axle portion 62 of the axle 40 is positioned in the first bore 58 of the housing 138 for slidable movement therein along the rotation axis 44, and the second axle portion 64 of the axle 40 is positioned in the second bore 160 and is smaller in diameter than the first axle portion 62. Illustratively, the first axle portion 62 slidably contacts the first bore 58.

The rotary actuator 166 is positioned in the second bore 60 and constrained axially therein relative to the rotation axis 44. The axle 40 and the rotary actuator 166 are positioned in threaded engagement with one another. The axle 40 is positioned in threaded engagement with an aperture 167 of the rotary actuator 166, the aperture 167 centered on the rotation axis 44. The second axle portion 64 and the aperture 167 of the rotary actuator 166 are positioned in threaded engagement with one another. The rotary actuator 166 may take the form of, for example, a body shaped as a disk, a periphery of which mates with the second bore 160.

A lock 68 releasably fixes the axle 40 to the rotary actuator 166. The axle 40 and the lock 68 are positioned in threaded engagement with one another such that the lock 68 contacts the rotary actuator 166 thereby releasably fixing the axle 40, the rotary actuator 166, and the lock 68 to one another. The second axle portion 64 and the lock 68 are so positioned in threaded engagement with one another.

The rotary actuator 166 is positioned axially between the retainer 70 and the shoulder 72 relative to the rotation axis 44. The retainer 68 and the shoulder 72 constrain the rotary actuator 166 axially relative to the rotation axis 44, and, as such, constrain the axle 40 and the rotor 42 mounted thereto axially relative to the rotation axis 44 during operation of the guide unit 136.

The guide unit 136 is configurable to allow axial movement of the axle 40 and the rotor 42 mounted thereto relative to the rotation axis 44 between operational positions, for lateral adjustment of the rotor 42 relative to the conveyor 34 to avoid or correct misalignment therebetween. To do so, the lock 68 is rotated out of contact with the rotary actuator 166, and a rotary input 174 is applied to a tool receiver 176 included in the rotary actuator 166, rather than the axle 40.

A person may apply the rotary input 174 to the tool receiver 176 by use of a tool. The tool receiver 176 may comprise a plurality of apertures 177 extending through the rotary actuator 166. The tool may be, for example, a spanner wrench received by the apertures 177 of the tool receiver 176.

Rotation of the tool so received by the tool receiver 176 causes the rotary actuator 166 to rotate about the rotation axis 44. The rotary actuator 166 is constrained axially relative to the rotation axis 44.

An anti-rotation arrangement 178 is configured to block a rotation about the rotation axis 44 to promote axial movement of the axle 40 and the rotor 42 mounted thereto relative to the rotation axis 44 in response to the rotary input 174. The anti-rotation arrangement 178 of the guide unit 136 is configured to block rotation of the axle 40 about the rotation axis 44 when the rotary actuator 166 is rotated about the rotation axis 44 in response to the rotary input 174. In this second embodiment, the axle 40 may omit the tool receiver 76 in view of the presence of the anti-rotation arrangement 178.

The anti-rotation arrangement 178 comprises an axial groove 188 and a dowel 190. In this second embodiment, the axle 40 comprises the axial groove 188 which extends axially relative to the rotation axis 44. The groove 188 is included, for example, in a periphery of the first axle portion 62 of the axle 40. The dowel 190 is received in an aperture 192 included in the housing 138, and extends from the housing 138 into the axial groove 188 to block rotation of the axle 40 about the rotation axis 44 upon rotation of the rotary actuator 166. In other embodiments, the axial groove may be included in the housing 138, and the dowel 190 or other projection may be included in the axle 40.

The rotary actuator 166 is configured to move the axle 40 and the rotor 42 mounted thereto axially relative to the rotation axis 44 in response to the rotary input 174 applied to the rotary actuator 166. Rotation of the rotary actuator 166 causes the axle 40 and the rotor 42 mounted thereto to move axially along the rotation axis 44 relative to the housing 138 in response to the rotary input 174 applied to the rotary actuator 166.

As such, the axle 40 and the rotor 42 mounted thereto are selectively repositionable axially along the rotation axis 44 relative to the housing 138 between a first operational position fixed relative to the housing 138 (shown, for example, in solid lines in FIG. 9) and a fixed second operational position fixed relative to the housing (shown, for example, in dashed lines in FIG. 9), for lateral adjustment of the rotor 42 relative to the conveyor 34. The axle 40 and the rotor 42 mounted thereto are infinitely axially adjustable relative to the rotation axis 44 within an operational range (defined, for example, by the mechanical limits established by the guide unit 136 or other limits) including, for example, between the first operational position and the second operational position.

The anti-rotation arrangement 178 may be used to facilitate movement of the lock 68 into and out of contact with the housing 138. The anti-rotation arrangement 178 blocks rotation of the axle 40 when the lock 68 is threaded or unthreaded toward or away from the housing 238.

The second axle portion 64 comprises a first threaded portion 82, and the aperture 167 of the rotary actuator 166 comprises a second threaded portion 184 positioned in threaded engagement with the first threaded portion 82. The first and second threaded portions 82, 184 cooperate to provide an adjustment arrangement 186 configured to direct movement of the axle 40 and the rotor 42 mounted thereto axially relative to the rotation axis 44 in response to the rotary input 174.

Figure 10:
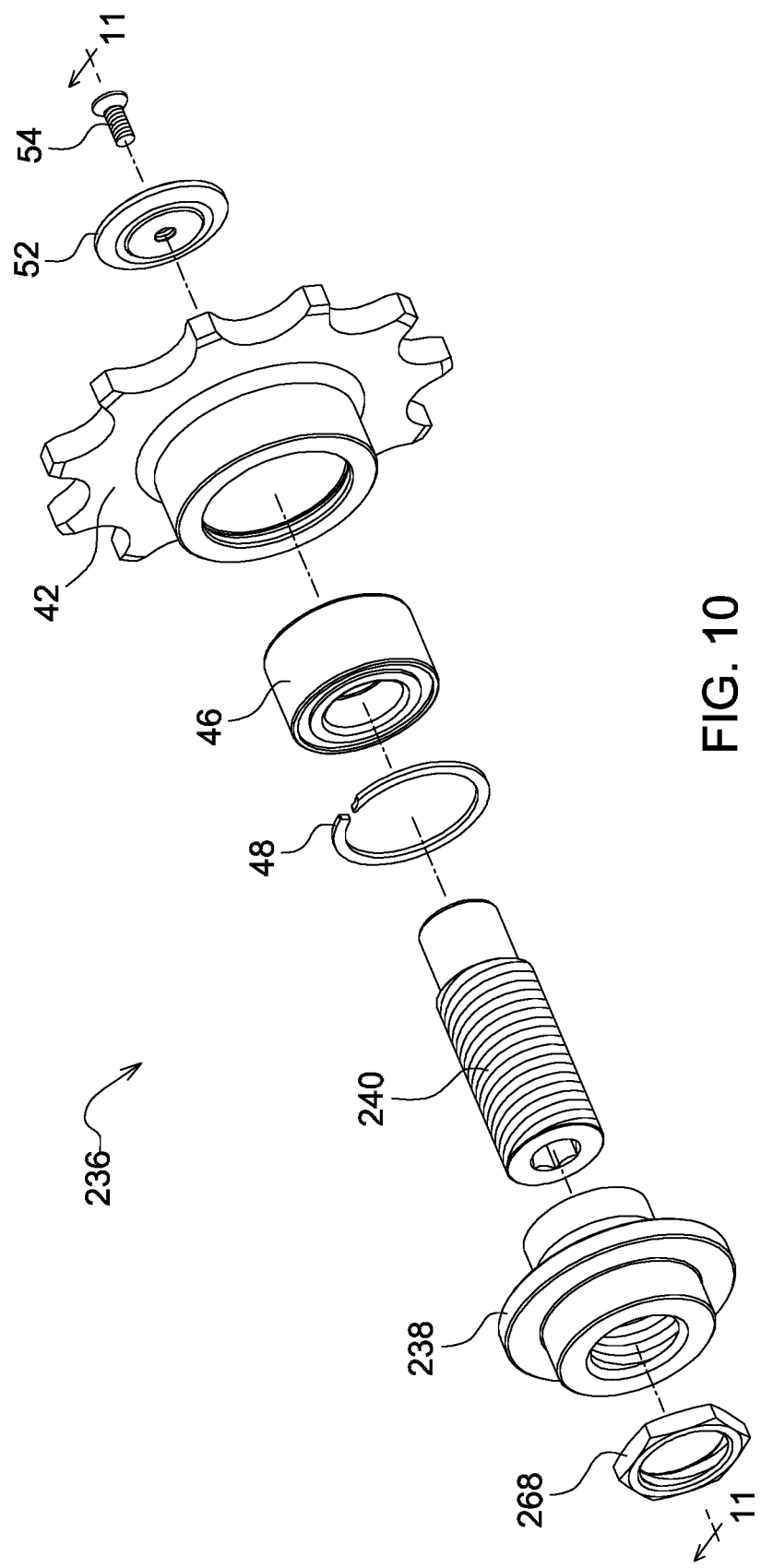
FIG. 10 is an exploded perspective view showing a guide unit according to a third embodiment.
Figure 11:
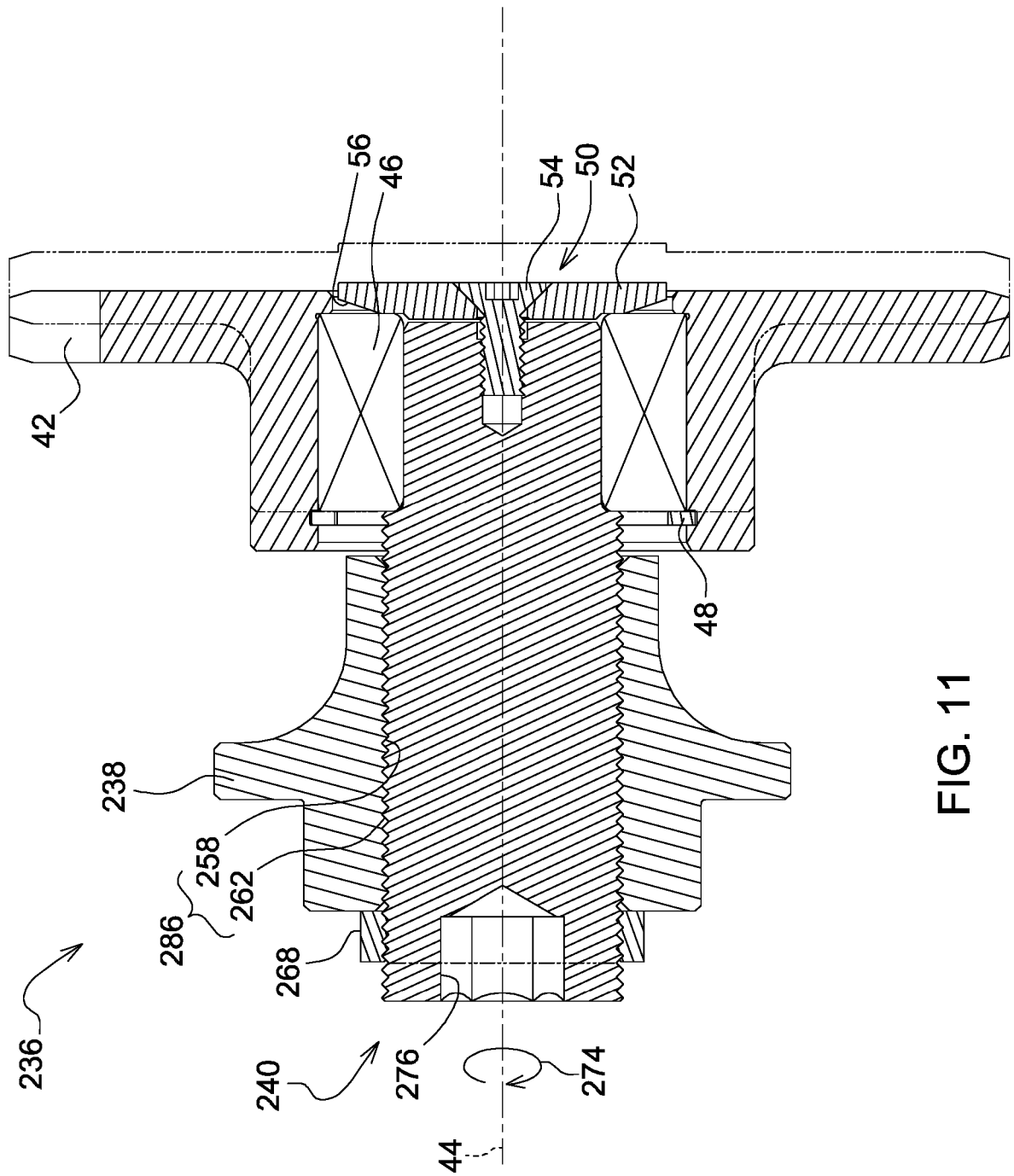
FIG. 11 is a sectional view, taken along lines 11-11 of FIG. 10, showing the conveyor guide unit according to the third embodiment.

Referring to FIGS. 10 and 11, in a third embodiment, a conveyor guide unit 236 may be employed for each of the conveyor guide units of the elevator 22. Similar reference numbers refer to similar components.

Each guide unit 236 comprises a housing 238, an axle 240 positioned in and supported by the housing 238 so as to be mounted thereto, and the rotor 42. The rotor 42 is mounted to the axle 240 in a manner similar to what is disclosed herein with respect to the axle 40.

The housing 238 is mounted to the frame 32. The housing 238 may be fixed (e.g., welded) to the frame 32. In an example, the housing 238 comprises an annular flange that abuts the frame 32, an outer portion extending laterally outwardly from the flange relative to the conveyor 34 and received in an aperture of the frame 32, and an inner portion extending laterally inwardly from the flange relative to the conveyor 34, with the flange and the outer portion fixed (e.g., welded) to the frame 32.

The axle 240 is positioned in the housing 238 and comprises a threaded portion 262. The housing 238 comprises a threaded bore 258. The axle 240 is positioned in the threaded bore 258 such that the axle 240 is positioned in threaded engagement with the bore 258, with the threaded portion of the axle 240 threaded to the bore 258. The axle 240 is centered on the rotation axis 44 about which the rotor 42 rotates.

A lock 268 releasably fixes the axle 240 to the housing 238 against axial movement relative to the rotation axis 44. The axle 240 and the lock 268 are positioned in threaded engagement with one another. The lock 268 contacts the housing 238 thereby releasably fixing the axle 240, the housing 238, and the lock 268 to one another. The lock 268 may be configured, for example, as a threaded nut (e.g., a jam nut).

The guide unit 236 is configurable to allow axial movement of the axle 240 and the rotor 42 mounted thereto relative to the rotation axis 44 between operational positions, for lateral adjustment of the rotor 42 relative to the conveyor 34 to avoid or correct misalignment therebetween. To do so, the lock 268 is rotated out of contact with the housing 238, and a rotary input 274 is applied to a tool receiver 276 included in the axle 240 by a tool (e.g., an Allen key). A person may apply the rotary input 274 to the tool receiver 276 by use of a tool. Rotation of the tool so received by the tool receiver 276 causes the axle 240 to move axially relative to the rotation axis 44 in an axial direction corresponding to the direction of rotation of the rotary input 274. As such, rotation of the axle 240 causes the axle 240 and the rotor 42 mounted thereto to move axially along the rotation axis 44 relative to the housing 238 in response to the rotary input 274 applied to the axle 240.

As such, the axle 240 and the rotor 42 mounted thereto are selectively repositionable axially along the rotation axis 44 relative to the housing 238 between a first operational position fixed relative to the housing 238 (shown, for example, in solid lines in FIG. 11) and a fixed second operational position fixed relative to the housing (shown, for example, in dashed lines in FIG. 11), for lateral adjustment of the rotor 42 relative to the conveyor 34. The axle 240 and the rotor 42 mounted thereto are infinitely axially adjustable relative to the rotation axis 44 within an operational range (defined, for example, by the mechanical limits established by the guide unit 236 or other limits) including, for example, between the first operational position and the second operational position.

The tool receiver 276 may be used to facilitate movement of the lock 268 into and out of contact with the housing 238. The tool (e.g., an Allen key) may be inserted into the tool receiver 276 to prevent the axle 240 from rotating when the lock 268 is threaded or unthreaded toward or away from the housing 238.

The threaded portion 262 of the axle 240 provides a first threaded portion, and the threaded bore 258 provides a second threaded portion positioned in threaded engagement with the first threaded portion. The first and second threaded portions cooperate to provide an adjustment arrangement 286 configured to direct movement of the axle 240 and the rotor 42 mounted thereto axially relative to the rotation axis 44 in response to the rotary input 274.

Figure 12:
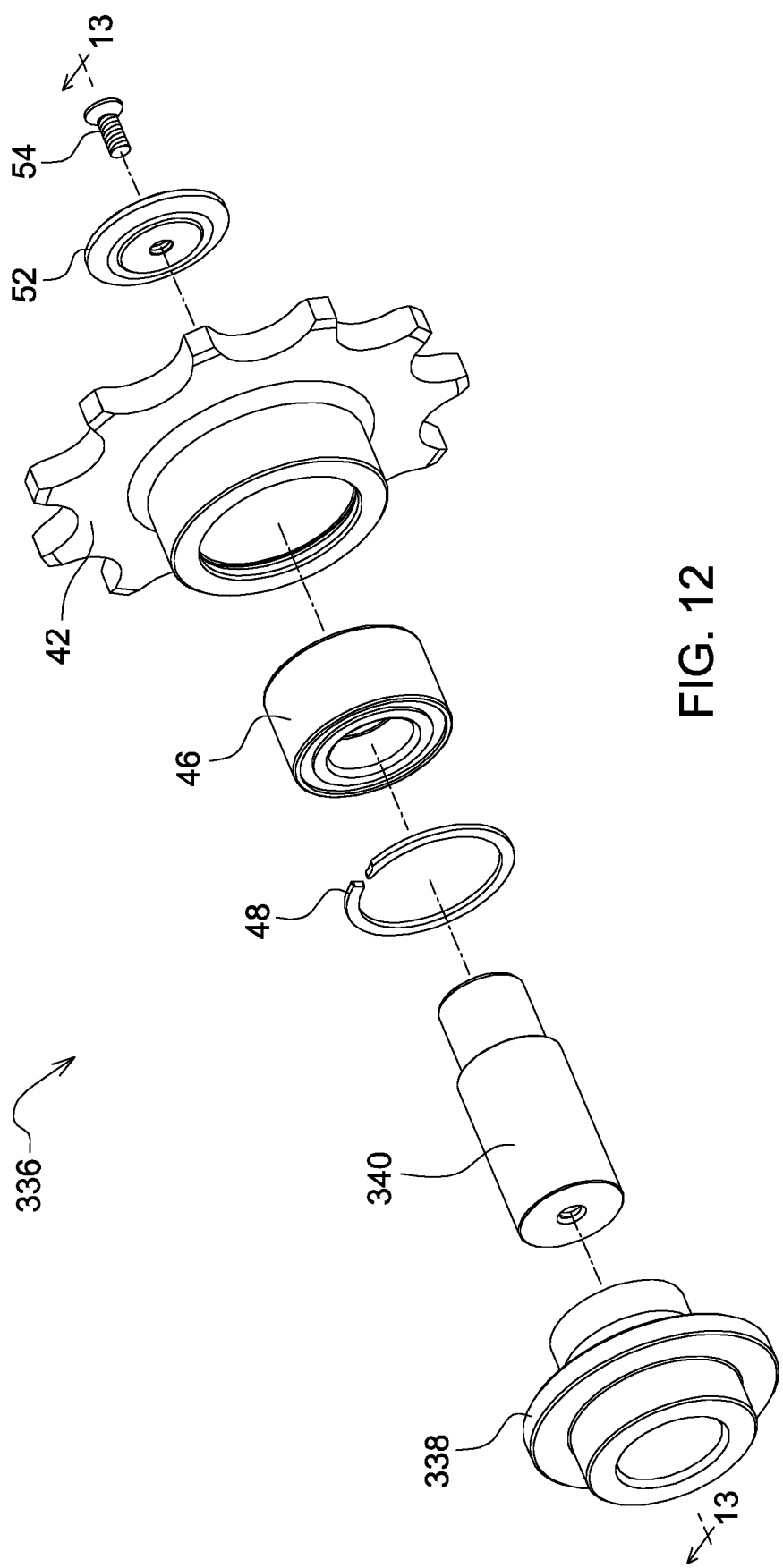
FIG. 12 is an exploded perspective view showing a guide unit according to a fourth embodiment.
Figure 13:
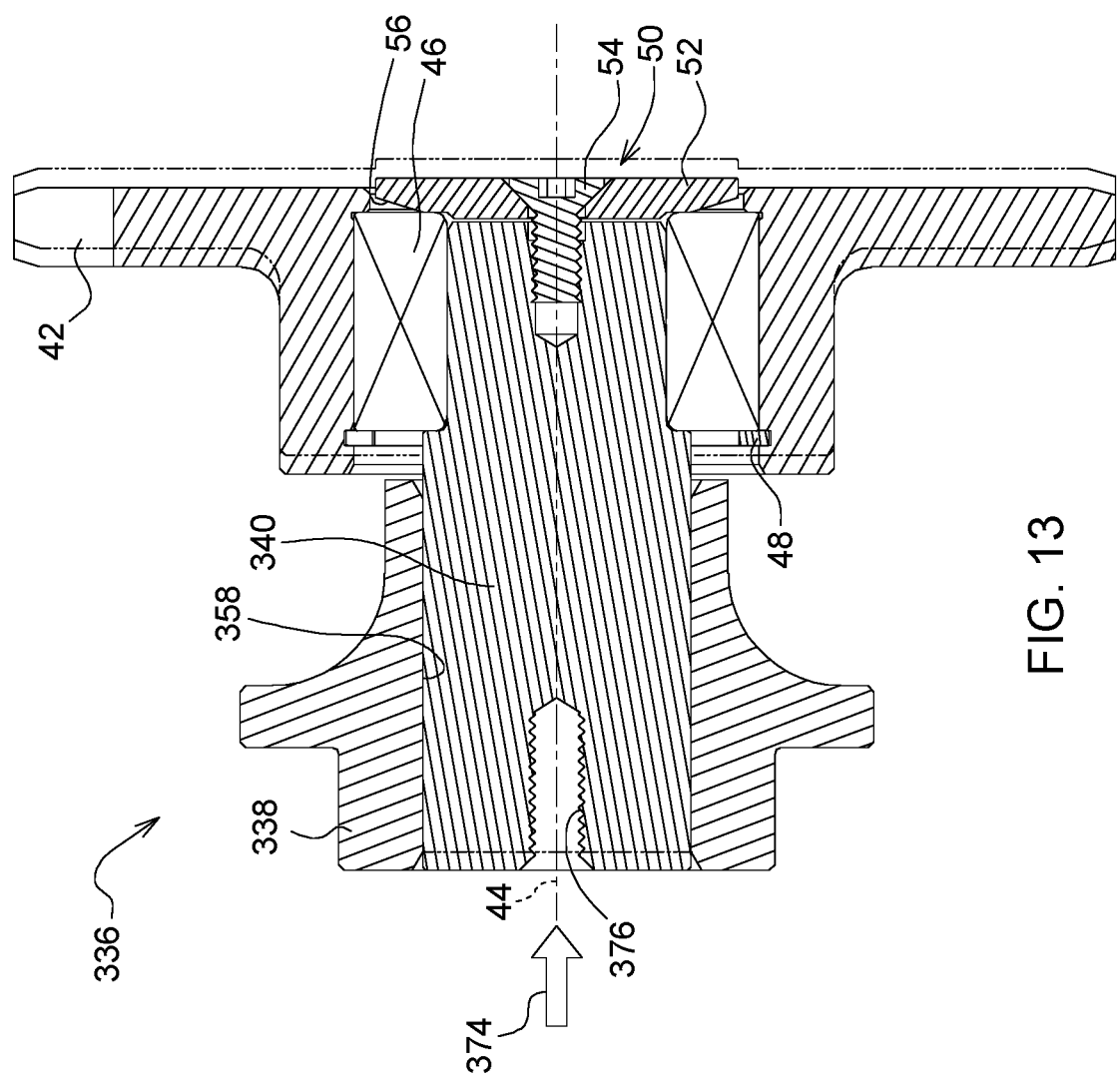
FIG. 13 is a sectional view, taken along lines 13-13 of FIG. 12, showing the conveyor guide unit according to the fourth embodiment.

Referring to FIGS. 12 and 13, in a fourth embodiment, a conveyor guide unit 336 may be employed for each of the conveyor guide units of the elevator 22. Similar reference numbers refer to similar components.

Each guide unit 336 comprises a housing 338, an axle 340 positioned in and supported by the housing 338 so as to be mounted thereto, and the rotor 42. The rotor 42 is mounted to the axle 340 in a manner similar to what is disclosed herein with respect to the axle 40.

The housing 338 is mounted to the frame 32. The housing 338 may be fixed (e.g., welded) to the frame 32. In an example, the housing 338 comprises an annular flange that abuts the frame 32, an outer portion extending laterally outwardly from the flange relative to the conveyor 34 and received in an aperture of the frame 32, and an inner portion extending laterally inwardly from the flange relative to the conveyor 34, with the flange and the outer portion fixed (e.g., welded) to the frame 32.

The axle 340 is positioned in the housing 338, such that the axle 340 is centered on the rotation axis 44 about which the rotor 42 rotates. The axle 340 engages a cylindrical bore 358 of the housing 338 via a press-fit. The press-fit between the axle 340 and the bore 358 of the housing 338 fixes the axle 340 to the housing 238 to maintain the rotor 42 in the selected operational position.

The guide unit 336 is configurable to allow axial movement of the axle 340 and the rotor 42 mounted thereto relative to the rotation axis 44 between operational positions, for lateral adjustment of the rotor 42 relative to the conveyor 34 to avoid or correct misalignment therebetween. To do so, an axial force 374 may be applied to the axially outer end of the axle 340 to move the axle 340 and the rotor 42 mounted thereto axially inwardly. For example, a hammer may be used to apply the axial force 374 to a donut, or other force-distributing device, positioned in contact with the axially outer end of the axle 340, to drive the axle and the rotor 42 mounted thereto axially inwardly. The axle 340 and the rotor 42 mounted thereto may be moved axially outwardly by use of a tool (e.g., a slide hammer) applied to a tool receiver 376 (e.g., threaded to receive a slide hammer) to pull the axle 340 and the rotor 42 mounted thereto axially outwardly.

As such, the axle 340 and the rotor 42 mounted thereto are selectively repositionable axially along the rotation axis 44 relative to the housing 338 between a first operational position fixed relative to the housing 338 (shown, for example, in solid lines in FIG. 13) and a fixed second operational position fixed relative to the housing (shown, for example, in dashed lines in FIG. 13), for lateral adjustment of the rotor 42 relative to the conveyor 34. The axle 340 and the rotor 42 mounted thereto are infinitely axially adjustable relative to the rotation axis 44 within an operational range (defined, for example, by the mechanical limits established by the guide unit 336 or other limits) including, for example, between the first operational position and the second operational position.

Figure 14:
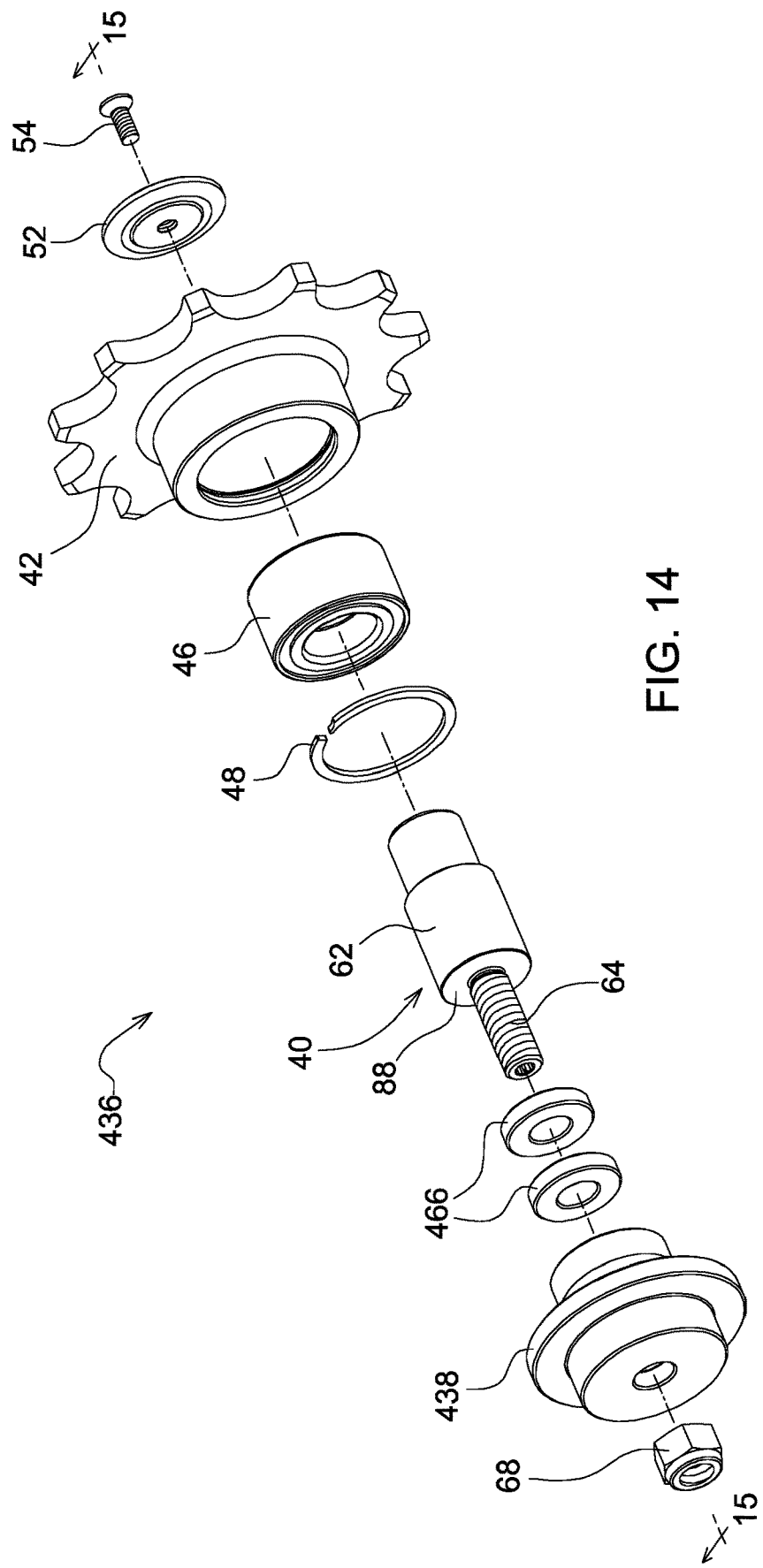
FIG. 14 is an exploded perspective view showing a guide unit according to a fifth embodiment.
Figure 15:
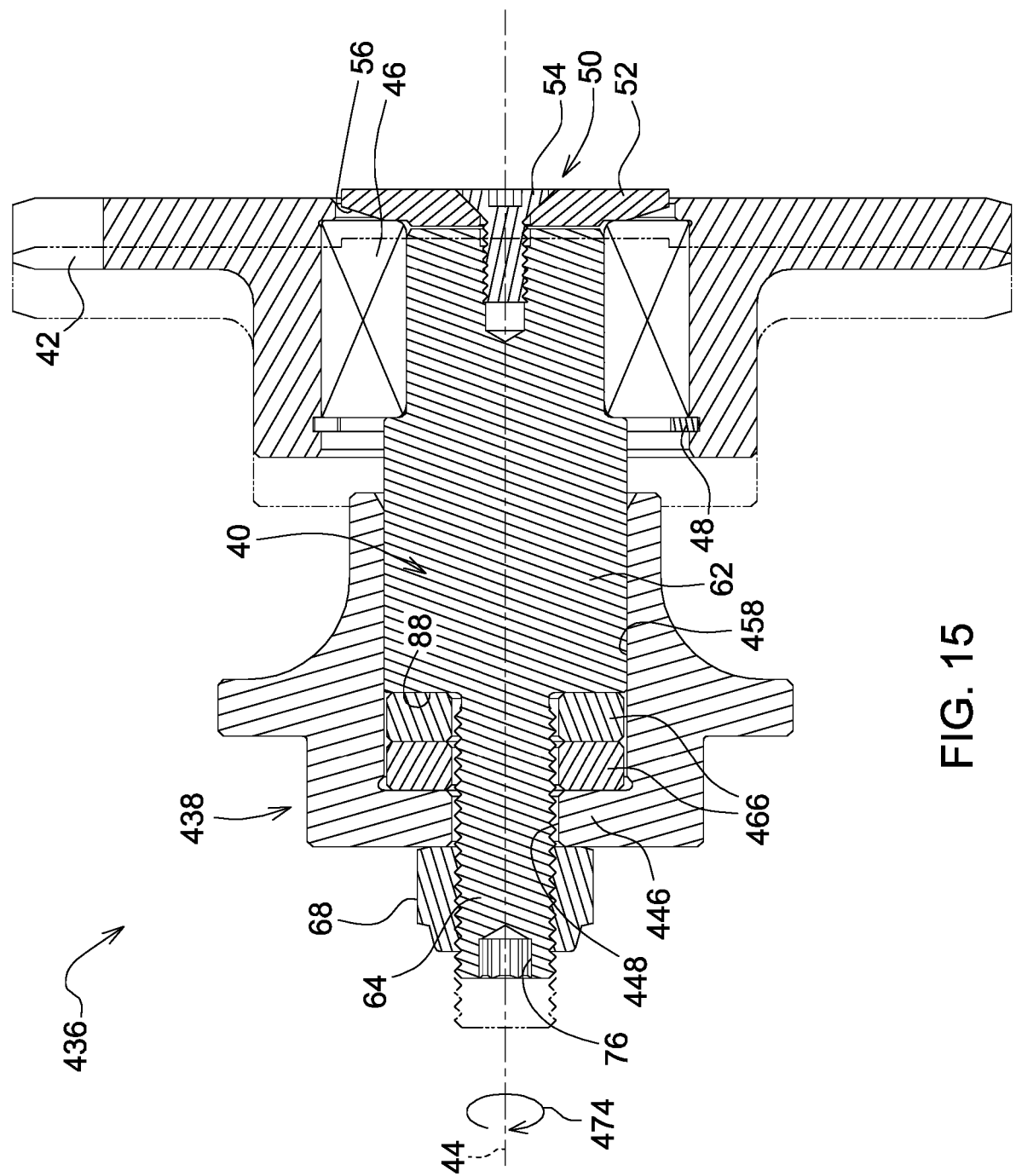
FIG. 15 is a sectional view, taken along lines 15-15 of FIG. 14, showing the conveyor guide unit according to the fourth embodiment.

Referring to FIGS. 14 and 15, in a fifth embodiment, a conveyor guide unit 436 may be employed for each of the conveyor guide units of the elevator 22. Similar reference numbers refer to similar components.

The guide unit 436 comprises a housing 438 positioned in and supported by the frame 32 so as to be mounted thereto, the axle 40 positioned in the housing 138, and the rotor 42 mounted to the axle 40. The housing 438 may be fixed (e.g., welded) to the frame 32. In an example, the housing 438 comprises an annular flange that abuts the frame 32, an outer portion extending laterally outwardly from the flange relative to the conveyor 34 and received in an aperture of the frame 32, and an inner portion extending laterally inwardly from the flange relative to the conveyor 34, with the flange and the outer portion fixed (e.g., welded) to the frame 32. In this fifth embodiment, the housing 438 may also comprise an end wall 446 extending radially inwardly from the outer portion of the housing 438, such that the end wall 446 comprises an aperture 448 for the axle 40.

The axle 40 is positioned in the housing 438. The axle 40 is positioned in a cylindrical bore 458 of the housing 438. The axle 40 and the bore 458 are co-axial with one another and centered on the rotation axis 44. The first axle portion 62 of the axle 40 is positioned in the bore 458 for slidable movement therein along the rotation axis 44, and the second axle portion 64 of the axle 40 extends axially relative to the rotation axis 44 from the first axle portion 62 through the aperture 448 to a region outside the housing 438.

The guide unit 436 comprises one or more annular shims 466. Each shim 466 is positioned axially between a shoulder 88 of the first axle portion 62 and the end wall 446 relative to the rotation axis 44. The shim(s) 466 are used to set the operational position of the axle 40 and the rotor 42 mounted thereto. In the case of plural shims 466, the shims 466 may be different (FIGS. 14-15) or the same in size.

A lock 68 releasably fixes the axle 40 and the rotor 42 mounted thereto in that operational position. To do so, the lock 68 releasably fixes the axle 40 to the end wall 446 of the housing 438. The axle 40 and the lock 68 are positioned in threaded engagement with one another such that the lock 68 contacts the end wall 446 of the housing 438 thereby releasably fixing the axle 40, the end wall 446 of the housing 438, and the lock 68 to one another. The second axle portion 64 and the lock 68 are so positioned in threaded engagement with one another. As such, while the shim(s) 466 are used to set the operational position of axle 40 and the rotor 42 mounted thereto, the lock 68 fixes the axle 40 and the rotor 42 mounted thereto in that position.

The guide unit 436 is configurable to allow axial movement of the axle 40 and the rotor 42 mounted thereto relative to the rotation axis 44 between operational positions, for lateral adjustment of the rotor 42 relative to the conveyor 34 to avoid or correct misalignment therebetween. To do so, the lock 68 is removed from the axle 40. The axle 40 is then removed from the housing 438. The rotor 42 may still be mounted to the axle 40, or may have been removed from the axle in advance. One or more shims 466 may be added to or removed from the bore 458 of the housing 438. Afterwards, the axle 40 is reinstalled in the bore 468 of the housing 438, and the lock 68 is reinstalled on the first axle portion 62 of the axle 40 to lock the axle 40 in the new operational position along with the rotor 42, which may be mounted to the axle 40 before or after the lock 68 is reinstalled. The tool receiver 76 may be used to facilitate movement of the lock 68 into and out of contact with the wall 446. The tool (e.g., an Allen key) may be inserted into the tool receiver 76 to prevent the axle 40 from rotating when the lock 68 is threaded or unthreaded toward or away from the wall 446.

As such, the axle 40 and the rotor 42 mounted thereto are selectively repositionable axially along the rotation axis 44 relative to the housing 438 between a first operational position fixed relative to the housing 438 (shown, for example, in solid lines in FIG. 14) and a fixed second operational position fixed relative to the housing (shown, for example, in dashed lines in FIG. 15), for lateral adjustment of the rotor 42 relative to the conveyor 34. The axle 40 and the rotor 42 mounted thereto are infinitely axially adjustable relative to the rotation axis 44 within an operational range (defined, for example, by the mechanical limits established by the guide unit 436 or other limits) including, for example, between the first operational position and the second operational position.

Lateral adjustability of the rotor 42, as disclosed herein, may promote life of the conveyor 34. For example, lateral adjustability may promote life of the rotors 42, chains 31, bearings 46, and a motor bearing of the drive unit 35.

While the present disclosure has been illustrated and described in detail in the drawings and foregoing description, such illustration and description is to be considered as not restrictive in character. It is to be understood that all changes and modifications that come within the spirit of the present disclosure are desired to be protected. It will be noted that alternative embodiments of the present disclosure may not include all of the features shown and described. Those of ordinary skill in the art may readily devise their own implementations that incorporate one or more of the features of the present disclosure and fall within the spirit and scope of the appended claims.

What is claimed is:

1. A conveyor guide unit for use in an elevator of a sugarcane harvester, the elevator comprising a closed-loop conveyor configured to convey harvested sugarcane, the conveyor guide unit comprising
a housing,
an axle positioned in and supported by the housing,
a rotor mounted to the axle for rotation about a rotation axis and configured to interface with the conveyor,
a body, and
a retainer mounted to the housing, wherein the axle and the rotor mounted thereto are selectively repositionable axially along the rotation axis relative to the housing between a first operational position fixed relative to the housing and a second operational position fixed relative to the housing, for lateral adjustment of the rotor relative to the conveyor, the axle is releasably fixed to the body, the housing comprises a shoulder, and the body is positioned axially between the retainer and the shoulder relative to the rotation axis such that the retainer and the shoulder constrain axially the body and the axle releasably fixed thereto relative to the rotation axis.

2. The conveyor guide unit of claim 1, comprising a lock, wherein the axle and the body are positioned in threaded engagement with one another, the axle and the lock are positioned in threaded engagement with one another such that the lock contacts the body thereby releasably fixing the axle, the body, and the lock to one another.

3. A conveyor guide unit for use in an elevator of a sugarcane harvester, the elevator comprising a closed-loop conveyor configured to convey harvested sugarcane, the conveyor guide unit comprising
a housing,
an axle positioned in and supported by the housing,
a rotor mounted to the axle for rotation about a rotation axis and configured to interface with the conveyor, and
a body, wherein the axle and the rotor mounted thereto are selectively repositionable axially along the rotation axis relative to the housing between a first operational position fixed relative to the housing and a second operational position fixed relative to the housing, for lateral adjustment of the rotor relative to the conveyor, the housing comprises a first bore and a second bore, the body is positioned in the second bore, and the axle is positioned in the first and second bores and is positioned in threaded engagement with an aperture of the body.

4. The conveyor guide unit of claim 3, wherein the second bore is larger in diameter than the first bore.

5. The conveyor guide unit of claim 4, wherein the first bore is positioned axially between the second bore and the rotor relative to the rotation axis.

6. A conveyor guide unit for use in an elevator of a sugarcane harvester, the elevator comprising a closed-loop conveyor configured to convey harvested sugarcane, the conveyor guide unit comprising
a housing,
an axle positioned in and supported by the housing,
a rotor mounted to the axle for rotation about a rotation axis and configured to interface with the conveyor, and
a reaction device, wherein the axle and the rotor mounted thereto are selectively repositionable axially along the rotation axis relative to the housing between a first operational position fixed relative to the housing and a second operational position fixed relative to the housing, for lateral adjustment of the rotor relative to the conveyor, and the axle is positioned in threaded engagement with an eccentric aperture of the reaction device.

7. The conveyor guide unit of claim 6, wherein the housing comprises a first bore and a second bore, the first bore is centered on the rotation axis, the second bore has a central axis offset from the rotation axis, the reaction device is mounted in the second bore and constrained axially relative to the rotation axis and the central axis of the second bore, and the axle is positioned in the first and second bores.

8. The conveyor guide unit of claim 7, wherein the eccentric aperture is centered on the rotation axis so as to be offset relative to the central axis of the second bore such that the second bore blocks rotation of the reaction device relative to the rotation axis in response to application of a rotary input to the axle.

9. The conveyor guide unit of claim 7, wherein the second bore is larger in diameter than the first bore, and the axle comprises a first axle portion positioned in the first bore and a second axle portion that is positioned in the second bore and is smaller in diameter than the first axle portion.

10. The conveyor guide unit of claim 9, wherein the first axle portion is positioned for slidable movement in the first bore along the rotation axis, and the second axle portion is positioned in threaded engagement with the eccentric aperture.

* * * * *